United States Patent [19]
Tucek

[11] 3,911,981
[45] Oct. 14, 1975

[54] TREE HARVESTING APPARATUS
[75] Inventor: Frank J. Tucek, Wausau, Wis.
[73] Assignee: J. I. Case Company, Racine, Wis.
[22] Filed: Oct. 29, 1974
[21] Appl. No.: 518,507

[52] U.S. Cl............. 144/34 R; 144/3 D; 144/34 E; 214/3; 214/147 G; 294/106
[51] Int. Cl.² .......................................... A01G 23/08
[58] Field of Search ........ 144/2 Z, 3 D, 34 R, 34 E, 144/309 AC; 214/3, 147 G; 294/88, 106; 83/102.1, 928

[56] References Cited
UNITED STATES PATENTS

| | | | |
|---|---|---|---|
| 3,631,995 | 1/1972 | Jones | 294/106 X |
| 3,664,391 | 5/1972 | Coffey | 83/102.1 X |
| 3,727,653 | 4/1973 | Tucek | 144/3 R X |
| 3,749,143 | 7/1973 | Hamilton | 144/34 R X |
| 3,805,860 | 4/1974 | Smith | 144/34 R X |

Primary Examiner—Donald R. Schran
Assistant Examiner—W. D. Bray
Attorney, Agent, or Firm—Dressler, Goldsmith, Clement & Gordon, Ltd.

[57] ABSTRACT

A tree accumulator mechanism for collecting a plurality of trees on a rigid support forming part of a tree harvesting apparatus is disclosed herein. The accumulator means consists of a compound linkage that is interposed between the rigid support and a movable arm that forms part of the tree grapple means for supporting a tree while it is being severed by tree cutting means. The linkage is arranged so that one link defines an arm for accumulating a plurality of trees relative to fixed tree engaging elements.

3 Claims, 4 Drawing Figures

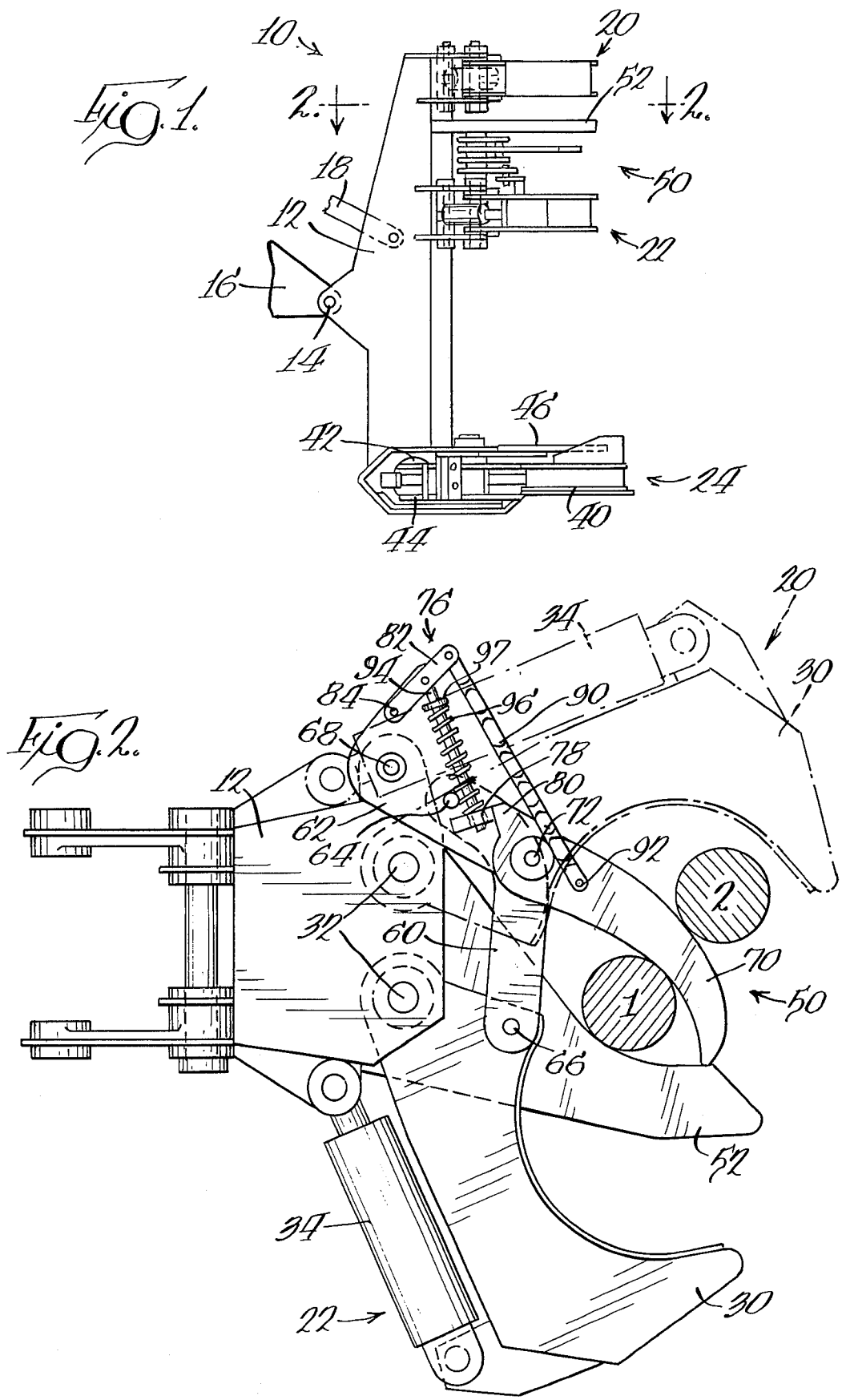

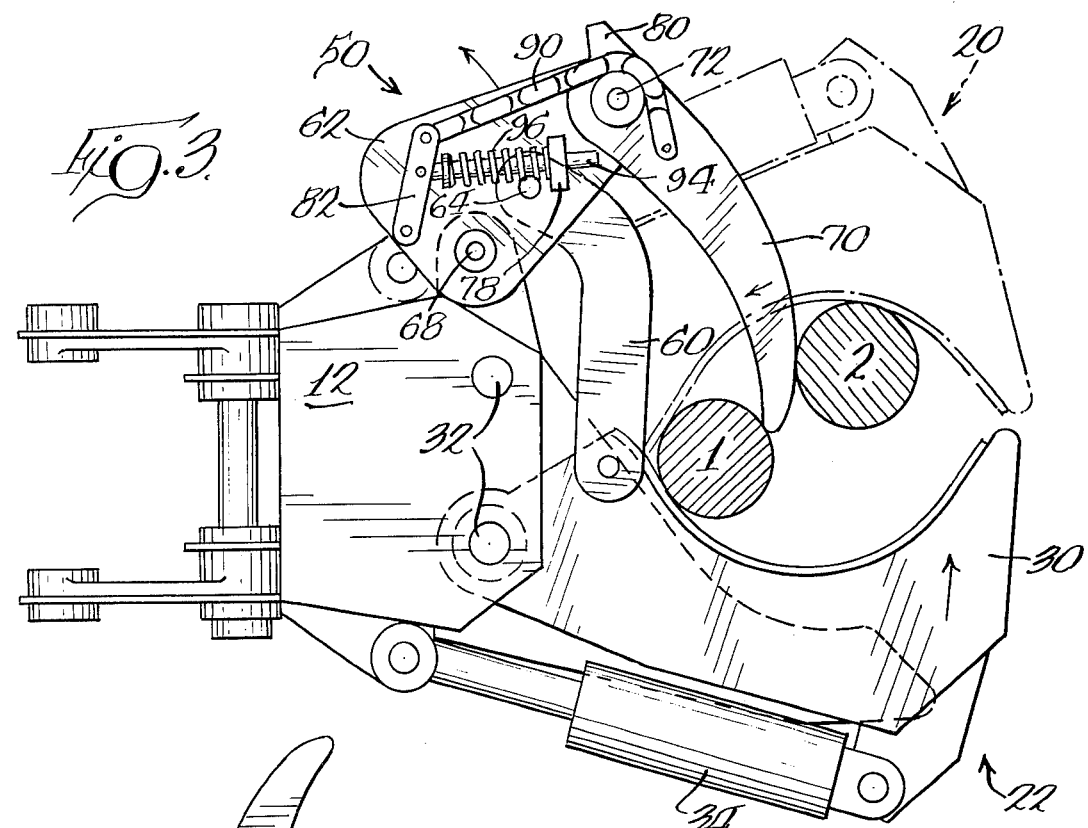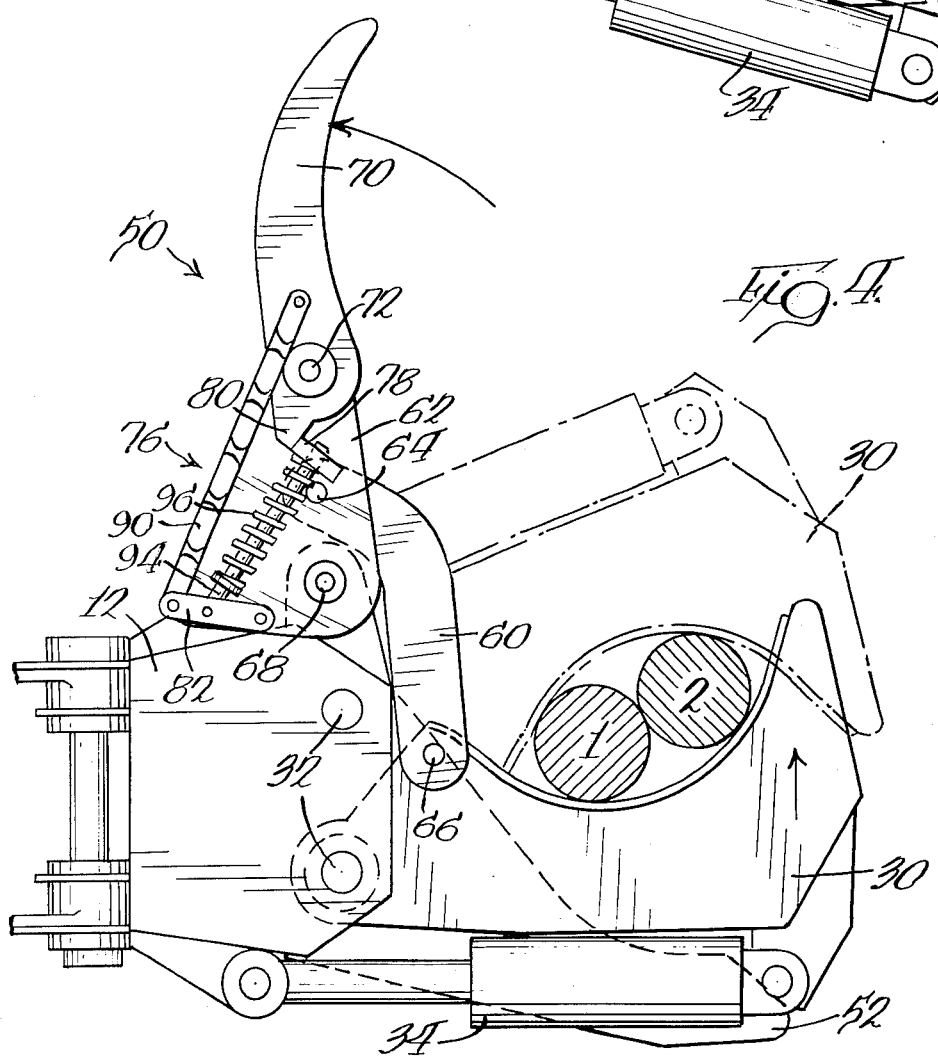

TREE HARVESTING APPARATUS

REFERENCE TO RELATED PATENTS

This application relates to an improvement for tree cutting apparatus of the type disclosed in U.S. Pat. No. 3,575,222, assigned to the assignee of the present invention.

BACKGROUND OF THE INVENTION

In recent years, numerous types of apparatus have been developed for felling trees. One type of mechanism or tree harvesting apparatus is disclosed in the above mentioned patent. The harvesting unit disclosed in this patent is capable of being attached to a conventional boom and dipper stick assembly for cutting standing timber. The unit consists of a grapple means supported on a frame and a tree cutting means also supported on the frame so that a standing tree may be grasped by the grapple means and severed adjacent the ground. The severed tree can then be manipulated to be deposited on the ground or on a trailer for ultimate transportation to a mill.

While this type of unit has been found to be extremely versatile, certain drawbacks have been noted. One of the problems that has been encountered is that, when harvesting small trees, it may not be expeditious to manipulate each individual tree for deposit on the ground or trailer. Thus, recent efforts have been devoted to providing improvements for a unit of this type which are capable of accumulating a plurality of individual trees on the support frame before the trees are deposited on the ground or a vehicle for further transportation.

One such unit for successively accumulating several trees on the tree lifting support frame is shown in Smith U.S. Pat. No. 3,805,860 issued Apr. 23, 1974. The accumulating mechanism disclosed in this patent consists of a pair of articulated finger parts that are individually moved by separate fluid rams to permit trees to be grouped on the support frame. While such a mechanism is capable of being incorporated into existing machinery of the type disclosed in the above mentioned Tucek patent, this mechanism consists of several parts, including two hydraulic cylinders, which add to the overall cost of the unit.

Another type of accumulating mechanism is disclosed in Coffey U.S. Pat. No. 3,664,391. This accumulating mechanism consists of a pair of arms that are pivoted on the rigid support by a fluid ram. Each of the arms has a first portion pivotally connected to the support and a second portion pivoted on the first portion and spring biased to a first position. Again this type of unit requires complex hydraulic circuitry as well as numerous expensive parts.

SUMMARY OF THE INVENTION

According to the present invention, a simple tree accumulator means for accumulating a plurality of trees on a tree harvesting apparatus is designed to be able to be added as an option to existing harvesting machinery.

The tree accumulating means of the present invention consists of a compound linkage which includes three links. Two of the links are pivotally connected to each other and have free ends respectively pivoted on a movable grapple arm and on the fixed support. The third link is pivotally supported on one of the first and second links and defines a tree engaging arm. The third arm is normally held in a first position with respect to the link on which it is pivoted by spring biasing means which accommodates pivotal movement of the links relative to each other when the movement of the third link is impeded by a tree.

BRIEF DESCRIPTION OF THE SEVERAL VIEWS OF THE DRAWINGS

FIG. 1 shows a side elevation of a portion of the tree harvesting apparatus;

FIG. 2 is a view of a portion of the apparatus shown in FIG. 1 as viewed along line 2—2;

FIG. 3 is a view similar to FIG. 2 showing the tree harvesting apparatus as it is moved towards a gripping position; and FIG. 4 is a view similar to FIGS. 2 and 3 showing a plurality of trees being accumulated.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a tree harvesting apparatus, generally designated by reference numeral 10. The majority of harvesting apparatus 10 is substantially identical to that disclosed in Tucek U.S. Pat. No. 3,575,222 and portions of this patent not inconsistent with the present disclosure are incorporated herein by reference.

Apparatus 10 consists of rigid support means or mast 12 pivotally supported by a pin 14 on the outer end of a boom which may be part of a mobile crane (not shown). Rigid support means 12 may be pivoted about pin 14 through a hydraulic fluid ram 18 interposed between boom 16 and support 12. Tree harvesting apparatus or tree feller 10 consists of an upper grab arm assembly, generally designated by the reference numeral 20, and intermediate grab arm assembly, generally designated by the reference numeral 22, and a lower tree engaging and shearing assembly, generally designated by the reference numeral 24. Each of these assemblies may be identical in construction to that disclosed in the above mentioned Tucek patent and the detailed description of the various parts will be deleted for purposes of simplicity. Only the parts necessary to the understanding of the present invention will be described below.

Upper and intermediate grab arm assemblies 20 and 22 define grapple means for grasping and holding a standing tree while it is being severed by shear assembly or tree cutting means 24. Each grab arm assembly consists of an arm 30 pivotally supported by a pin 32 on rigid support means 12 by a hydraulic fluid ram 34. Each arm 30 has a concave inner periphery 36 for engaging the periphery of a tree, which is normally generally circular. The two arms 30 define opposed jaws for gripping a tree therebetween.

Tree cutting means or severing means 24 consists of a pair of arms 40 that are pivotally supported on rigid frame 12 and are moved between open and closed positions by a single fluid ram 42 coupled to the arms through a pair of linkages 44 identical in construction to those described in the above mentioned Tucek patent. The cutting means or mechanism also incorporates a rigid tree engaging member or element 46 that is fixed with respect to rigid support means 12 and has a tree engaging surface (not shown) that is again concave or arcuate in configuration.

The tree accumulator means of the present invention is preferably located between the upper and intermediate grab arms 30 and cooperates with one of the grab arms to accumulate a plurality of small trees. Tree accumulator means or mechanism 50 is incorporated into the existing tree harvesting apparatus and is operated in response to movement of the grapple arm so that no separate actuators are required for the accumulator means. More specifically, accumulator means 50 consists of three links that are interconnected in a manner that one of the links acts as a gripping member for accumulating a plurality of trees on rigid support member 12.

Accumulator means 50 cooperates with upper and lower fixed tree engaging elements 46 and 52 to accumulate any number of trees on rigid support 12. Accumulator means 50 (FIG. 2) consists of first and second links 60 and 62 that are pivotally interconnected by a pivot pin 64. The free end of link 60 is pivotally supported on intermediate grab arm 30 by a pivot pin 66 that is spaced from pivot pin 32. The free end of second link 62 is pivotally supported on rigid frame or support means 12 by a pivot pin 68. Links 60 and 62 are configured so that they will move from an extended position shown in FIG. 2 to a collapsed position shown in FIG. 4 while intermediate grab arm 30 is moved from the open position shown in FIG. 2 to the closed or gripping position shown in FIG. 4.

The compound linkage defining tree accumulator means also includes a third link 70 that has one end pivoted by pivot pin 72 on second link 62. Second and third links 62 and 70 are normally held in end-to-end relation by biasing means 76 that normally pivots link or arm 70 to a first position defined by a stop 78 located in the path of movement of a projection 80 located on link or arm 70.

Biasing means 76 may consist of an arm 82 pivoted at one end by pivot pin 84 on second link 62. A flexible element or chain 90 has one end connected to the outer free end of arm 82 and the opposite end connected at 92 to the third link 70 at a location spaced from pivotal connection 72. A sleeve 93 surrounds the pivot pin 72 for a purpose to be described later. A rod 94 has one end supported on an intermediate portion of arm 82 and extends through an enlarged opening in stop 78 with a coil spring 96 encircling rod 82 and one end of the coil spring engaging fixed stop 78 while the opposite end engages a washer 97 fixed to the rod 94. Thus, biasing means 76 normally maintains links 62 and 72 in the substantially end-to-end relation shown in FIG. 4 when no external forces are applied to link 70.

OPERATION

Assuming that a first tree 1 has been cut by tree harvesting apparatus 10 and grab arm assemblies 20 and 22 have been moved from the closed position shown in FIG. 4 to the open position shown in FIG. 2. While grab arm assemblies 20 and 22 are moved between positions, arm 70 will be moved from the position shown in FIG. 4 to that shown in FIG. 2. In this position, tree 1 will be gripped between upper and lower tree engaging elements 52 and 46 and arm 70 as shown in FIG. 2.

Rigid support frame 12 is then manipulated so that a second tree 2 is positioned between link or arm 70 and upper arm or jaw 30, as shown in FIG. 2. During this manipulation, both upper and intermediate jaws or arms 30 are maintained in an open position and cutting means 24 is likewise in an open position to receive the second tree 2. In some instances it may be desirable to maintain cutting means partially closed to support the base of tree 1 while the outer ends of cutter blades are open sufficiently to receive tree 2.

Upper jaw or arm is then moved towards a closed position by actuation of fluid ram 34 to securely grip tree 2 between upper jaw and link 70. Subsequently, grab arm assemblies 20 and 22 are actuated and moved towards a closed position so that ultimately both trees 1 and 2 are gripped by upper and intermediate jaws 30. During this movement, first and second links 60 and 62 are moved from the extended position towards the fully collapsed position shown in FIG. 4. During this same time, third link 70 remains gripped between the two trees. Since the third link or arm 70 can be pivoted against the bias of biasing means 76, the link 70 is moved endwise from the position shown in FIG. 2, to that shown in FIG. 3 while the free end thereof is being moved outwardly. During this movement, flexible chain 90 is entrained over collar 93, as shown in FIG. 3, so that the opposite ends of chain 90 can be moved towards each other and the chain still remains under tension. After the outer free end of link or arm 70 moves beyond the periphery of tree 2, biasing means 76 automatically moves link 70 to the end-to-end relation with respect to link 62, as shown in FIG. 4. When the entire assembly is in the final position shown in FIG. 4, both trees 1 and 2 are securely grasped by upper and intermediate grab arm assemblies 20 and 22 and lower fixed tree engaging element 46 is in engagement with a lower portion of the tree. The second tree 2 may then be severed by actuation of cutting means 24. This operation can be repeated any number of times until a sufficient number of small trees are accumulated on rigid support 12 and then all of the accumulated trees can simultaneously be deposited on the ground or on a trailer for further processing.

As can be appreciated from the above description, the present invention provides an inexpensive mechanism that can be added to existing tree harvesting apparatus with minimum reconstruction and the entire mechanism can be operated by utilization of the existing actuators on the tree harvesting apparatus.

While one specific type of cutter means and grapple means have been shown and described, other cutters could be used as well as other types of tree accumulators.

What is claimed is:

1. Tree harvesting apparatus for use at the end of a boom movably supported on a vehicle comprising elongated rigid support means, grapple means pivotally supported on said support means for grasping and securely holding a standing tree, said grapple means including at least one arm pivoted about a fixed pivot on said support means, tree cutting means adjacent one end of said support means for severing a tree while being grasped by said grapple means, and tree accumulator means for accumulating a plurality of trees on said support means, the improvement of said tree accumulator means including a fixed tree engaging element on said support means, compound linkage means consisting of first and second pivotally interconnected links, said first link having one end pivoted on said rigid support means, said second link having one end pivoted on said at least one arm at a location spaced from said fixed pivot, a third link pivoted on one of said first and second links, and biasing means between said third link and said one of said first and second links, said biasing means normally maintaining said third link in a first position relative to said one of said first and second links and pivotal movement of said at least one arm will change the position of said links and move said third link between open and clamped positions relative to said fixed tree engaging element.

2. Tree harvesting apparatus as defined in claim 1, in which said rigid support means has a second tree engaging member fixed thereto and spaced from said fixed tree engaging element and in which said compound linkage is located between said tree engaging element and said tree engaging member.

3. Tree harvesting apparatus as defined in claim 2, in which said at least one arm is located between said tree engaging element and said tree engaging member and said grapple means includes a second arm pivoted on said support adjacent said tree engaging element with said first and second arms defining opposed jaws for gripping a tree.

* * * * *